(12) United States Patent
Merten et al.

(10) Patent No.: US 8,550,236 B2
(45) Date of Patent: Oct. 8, 2013

(54) EXTRACTION DEVICE, PARTICULARLY FOR MINING, AND METHOD FOR CONTROLLING THE EXTRACTION DEVICE

(75) Inventors: Gerhard Merten, Lünen (DE); Karl-Heinz Schürer, Herne (DE); Jörg Wirtz, Witten (DE); Manfred Bäumler, Fellbach (DE); Uwe Böker, Korb (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 552 days.

(21) Appl. No.: 12/675,797

(22) PCT Filed: Sep. 8, 2008

(86) PCT No.: PCT/EP2008/007327
§ 371 (c)(1),
(2), (4) Date: Sep. 27, 2010

(87) PCT Pub. No.: WO2009/033622
PCT Pub. Date: Mar. 19, 2009

(65) Prior Publication Data
US 2011/0024268 A1  Feb. 3, 2011

(30) Foreign Application Priority Data
Sep. 11, 2007 (DE) .......................... 10 2007 043 043

(51) Int. Cl.
*B65G 23/44* (2006.01)

(52) U.S. Cl.
USPC .............. 198/810.04; 198/810.01; 198/502.1; 198/813

(58) Field of Classification Search
None
See application file for complete search history.

(56) References Cited

U.S. PATENT DOCUMENTS

| | | | |
|---|---|---|---|
| 2,721,020 A * | 10/1955 | Meyer | 141/277 |
| 3,727,758 A * | 4/1973 | Cleland | 198/370.13 |
| 4,587,852 A * | 5/1986 | Butler et al. | 73/826 |
| 4,657,131 A | 4/1987 | Brychta et al. | |
| 4,824,354 A * | 4/1989 | Keaton | 425/345 |
| 7,117,989 B2 * | 10/2006 | Weigel et al. | 198/810.04 |

FOREIGN PATENT DOCUMENTS

| | | |
|---|---|---|
| DE | 2017949 | 10/1971 |
| DE | 3406519 A1 | 8/1985 |
| DE | 3926957 A1 | 2/1990 |

OTHER PUBLICATIONS

International Search Report, dated Apr. 17, 2009, for PCT/EP2008/007327, filed Sep. 8, 2008.

* cited by examiner

*Primary Examiner* — Kavel Singh
(74) *Attorney, Agent, or Firm* — Foley & Lardner LLP

(57) ABSTRACT

An extraction device, particularly for mining, having two drive stations and a drive chain which extends between the sprockets thereof. So that hanging chain or chain wear to a conveyor chain, in the case of a conveyor device, or to a plow chain, in the case of a plow device, can be detected, magnetic sensor units for detecting at least one chain condition of the drive chain are provided, wherein each sensor unit includes a transmitter, which is formed by a static or dynamic magnetic field generator, and a detector field, which is provided with a plurality of magnetic field detectors, as a detector, the detector and the transmitter being arranged to the side of a passage for the run of the drive chain that is to be scanned. The invention also relates to a method for controlling an extraction device for preventing hanging chain.

28 Claims, 5 Drawing Sheets

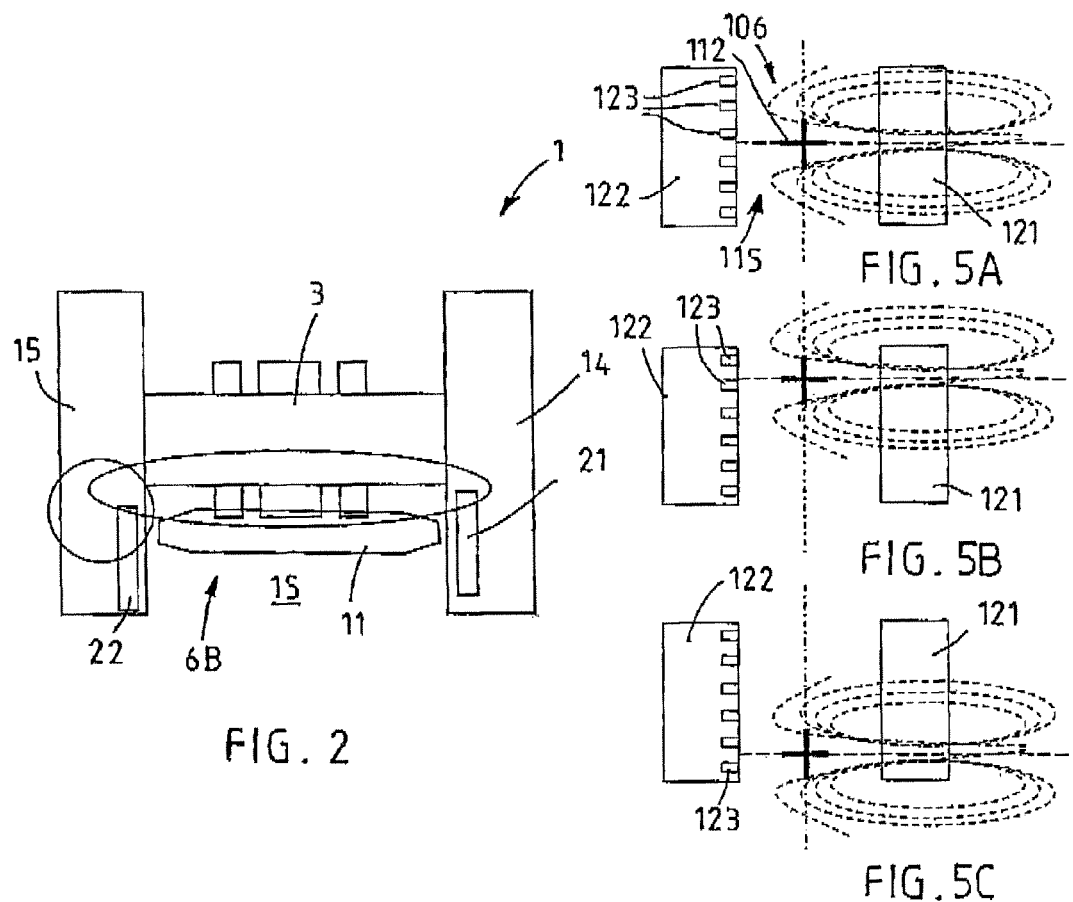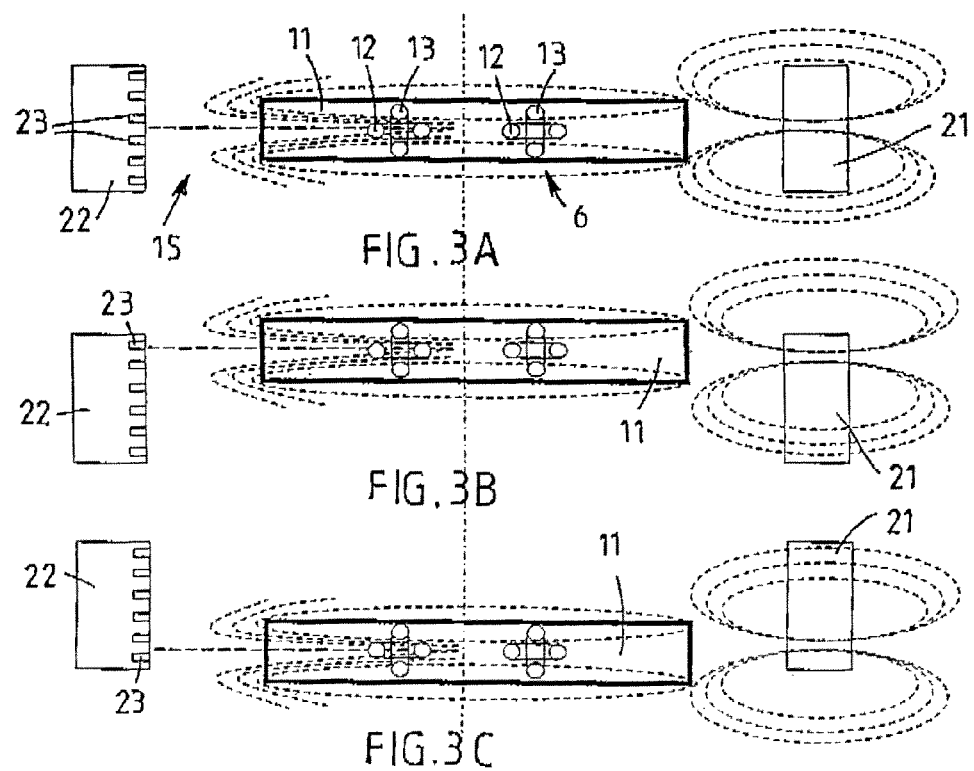

EXTRACTION DEVICE, PARTICULARLY FOR MINING, AND METHOD FOR CONTROLLING THE EXTRACTION DEVICE

This application claims priority to and the benefit of the filing date of International Application No. PCT/EP2008/007327, filed Sep. 8, 2008, which application claims priority to and the benefit of the filing date of German Application No. 10 2007 043 043.6, filed Sep. 11, 2007, both of which are hereby incorporated by reference into the specification of this application.

The invention relates to an extraction device, particularly for mining, having a first drive station and a second drive station which is preferably capable of being tensioned by a tensioning means, having sprockets which are mounted in the drive stations, having a drive chain which includes chain links, may be moved and/or deflected by means of the motor-drivable sprockets and extends between the sprockets in the form of an upper run and a lower run, and at least one sensor unit for detecting at least one chain condition of the drive chain in the upper run or the lower run. The invention also relates to a method for controlling an extraction device particularly for mining, having a first drive station and a second drive station which is preferably capable of being tensioned by a tensioning means, having sprockets which are mounted in the drive stations, having a drive chain which includes chain links, may be moved by means of the motor-driven sprockets and extends between the sprockets in the form of an upper run and a lower run, having at least one sensor unit for detecting at least one chain condition of the drive chain in the upper run or the lower run, and having a control device to which the signals from the sensor unit are supplied and by means of which the extension condition of the tensioning means and/or the drives of the drive stations may be controlled.

BACKGROUND OF THE INVENTION

When operating an extraction device having a circulating or reversing drive chain, it is enormously important to evaluate or monitor the chain condition of the drive chain and in particular the pre-tension of the chain by suitable measures. In principle, for this purpose optical, electrical, magnetic and mechanical sensor units, which are intended to supply measurement values from which the chain tension condition is to be derived and, using suitable algorithms, control parameters for the tensioning means or indeed also for the drive motors of the drive units are to be derived, have already been proposed.

DE 34 06 519 A1 proposes using a sensor unit which operates by magnetism to detect the chain tension magnetically in the case of tensionable drive stations. DE 34 06 519 proposes for this purpose a magnetic field generator which is associated with the respective run that comes from the drive station in the direction of movement of the chain. The magnetic field generator that is provided for measuring the chain tension in the upper run is arranged in the floor panel, and the magnetic field generator that is provided for measuring the chain tension in the lower run is arranged in the floor panel of the drive station above the lower run, in order to detect any alteration in the magnetic field that results from a change in the spacing between the drive chain that is to be measured and the links of the chain. In addition to hanging chain, the spacing between scrapers in a conveyor chain or indeed a change in the spacings between chain links is also to be established in combination with the regulation of hanging chain. The measuring principle in DE 34 06 519 is based on generating a directed magnetic field that is altered by the fact that chain links penetrate the magnetic field to different depths, wherein the alteration in the scanned magnetic field is to be evaluated by measuring technology. Since the magnetic transducer is arranged, with the measuring device, in the floor panel of the outgoing run, a large amount of wear is produced which only allows a short service life for a magnetic measuring system of this kind. It has not therefore been possible to develop the technical implementation of the system for detecting hanging chain and other chain conditions which is known from DE 34 06 519 A1 for mass production.

SUMMARY OF THE INVENTION

The invention of this application relates to an extraction device and a method for controlling an extraction device which make it possible to reliably detect the chain condition of the drive chain using a contactless sensor unit and which have a markedly longer service life with a high level of system reliability.

More particularly provided is an extraction device including a sensor unit having a transmitter, which is formed by a magnetic field generator, and a detector field, which is provided with a plurality of magnetic field detectors, as a detector, wherein the detector and the transmitter are constructed or positioned to the side of a passage for the run of the drive chain that is to be scanned. It is an advantage of the technical system of the extraction device according to the invention that the sensor unit does not evaluate an alteration in the magnetic field resulting from a difference in the spacing between the chain links and the magnetic field generator or detector by measuring technology, but scans a change in the position or height of the entrainer or chain link in the direction transverse to movement of the drive chain. In the extraction device according to the invention, the magnetic field is introduced into the drive chain and a measuring signal is detected for each magnetic field detector of the detector field. If the position of a chain link or an entrainer within the sensor field changes in relation to its position during the previous pass or in relation to a defined home position, it can be deduced whether the chain link or entrainer is further up or down in the region of the detector field. If at the same time a time signal is detected for each entrainer or chain link, then a different spacing between chain links or entrainers can be detected, and from this further chain conditions, such as chain wear, twisting of chains or similar can be determined.

The detector, which is constructed as a detector field, and the transmitter for the magnetic field may be arranged next to one another on the same side. In a preferred embodiment, the detector and transmitter are arranged opposite one another such that the transmitter introduces the magnetic field into the chain links or entrainers on the one side, and the magnetic field detectors of the detector field scan the magnetic field that is transmitted by the chain links or entrainers on the other side of the passage. To enable hanging chains in particular to be reliably detected, it is particularly advantageous if the detector field extends over the height of the passage, with a plurality of detectors. In one preferred embodiment, the detector field includes a plurality of magnetic field detectors that are arranged next to one another and a plurality of magnetic field detectors that are arranged above one another, in order to detect over a sufficiently large range the alternating magnetic field that is transmitted or passed on by the chain link or entrainer that is to be detected in a direction transverse to movement of the drive chain. To simplify the calculation work, in this arrangement the magnetic field detectors may be arranged in rows and columns at a constant spacing. Because the magnetic field detectors are arranged in two dimensions in the detector field, the magnetic field that is transmitted can be measured and scanned using magnetic field detectors that where appropriate measure and detect only the horizontal portions of the transmitted magnetic field.

It is advantageous if the detector field and/or the generator for the magnetic field are arranged, in particular incorporated, in the side panels of a machine frame or the side walls of a sprocket casing of the drive station. In the side panels or side walls, neither the detector nor the generator for the magnetic field is subject to any but negligible mechanical wear, since even in the event of hanging chain or maintenance work the chain links or entrainers do not come into contact with the transmitter and detector. In both side panels or side walls, there is usually sufficient structural space to integrate a detector field and a transmitter for the magnetic field. To prevent interactions with the surrounding structure that is formed by the machine frame, the detector field and/or the transmitter are preferably arranged in a housing or a support structure made from non-magnetic material. The material may in particular be brass, bronze, copper, aluminum, titanium, austenitic steel or alloys therewith, ceramic or synthetic material. The material or material alloys that are used should meet all the requirements of explosion-proofing (protection against firedamp and against gas explosion) for the respective intended use. According to a variant embodiment according to the invention, the magnetic field generators make it possible to generate a static magnetic field that is constant over time. According to an advantageous alternative embodiment, alternating magnetic field generators are used as transmitters to generate a dynamic alternating magnetic field. As a result of using alternating magnetic field generators as transmitters for the magnetic sensor unit, a modulated magnetic field is used for measurement, which prevents erroneous measurements from occurring as a result of the chain links or entrainers that are to be scanned having different preferential directions of magnetization. Tests carried out by the Applicant have shown that, on magnetization in a direction transverse to movement of the drive chain, chain links and entrainers that are used in drive chains of conveyors (chain scrapers) display markedly different magnetic flux densities and amplification of the magnetic field emitted by the magnetic generator. When alternating magnetic field generators are used, any dependence on the preferential direction of magnetization of the entrainer or chain link that is to be scanned is avoided, because the alternating magnetic field is scanned using the detectors in the detector field. In the case of a preferred embodiment, the transmitter or alternating magnetic field generator is formed by a rotary or rotating magnet. The speed of rotation of the magnet may be at least about 100 rpm, and up to 1000 rpm or more. Also preferably, the magnet may have a magnetic field strength of at least about 0.5 T (tesla). The rotary or rotating magnet may in particular be a permanent magnet. In this arrangement, the transmitter may contain one or indeed more rotary or rotating magnets in order to attain a high alternating frequency of the alternating magnetic field even at low speed. The plurality of permanent magnets may in particular be arranged in a rotary support made of non-magnetic material. To meet the needs of explosion-proofing, the transmitter for the alternating magnetic field preferably includes a hydraulic rotary drive, in particular a hydraulic motor with a current-regulating valve for adjusting the speed of rotation. The hydraulic medium may be taken from the central subterranean hydraulic supply for the safety shields or support plates and have its pressure level reduced by means of a pressure-regulating stage to a level permissible for the hydraulic motor. It may then be switched on and off by way of pre-controlled multi-way valves. It is particularly advantageous if a rotational position sensor is associated with the rotary drive for the transmitter in order to detect the presently prevailing rotational position of the modulator and to supply it to the evaluation and control unit.

In a further variant embodiment, the magnet or plurality of magnets of the transmitter can form a magnet arrangement whereof the position and/or alignment in relation to the magnetic field sensor is variable in order to generate a magnetic field whereof the magnetic field strength is in particular variable. For this purpose the transmitter may preferably include a magnet arrangement having a plurality of ring magnets which are arranged concentrically around a central axis, wherein the annular arrangement may be turned about the central axis by means of an actuator. It is particularly advantageous in this case if the magnet arrangement may be positioned in different turned positions by means of the actuator. This may be achieved for example by a self-locking actuator which has a considerable stepping-down effect and may in particular comprise an electrical actuator that is switched to the desired turned position without the application of current.

The extraction device may take the form of a conveyor with entrainers in the drive chain, and in this case each drive station includes where appropriate only one sensor unit, which is associated with the run that comes from the drive station, in the direction of movement of the chain respectively downstream of the sprocket. Because the driving and regulation of conveyors usually operates with a main drive and an auxiliary drive, one sensor unit would be arranged in the lower run of the main drive and a second sensor unit would be arranged in the upper run of the auxiliary drive. As an alternative, the extraction device may for example be a plow device with a reversible drive chain, in which case each drive station includes two sensor units, of which in each drive station one sensor unit is associated with the upper run and one sensor unit is associated with the lower run. In the case of reversing drive chains, the drives of the drive stations have to perform the main work depending on the direction in which the extraction machine is running, with the result that hanging chain can occur in either drive station, upstream or downstream of the sprocket. However, it is also possible in conveyors for a sensor unit to be associated with each run in the drive station.

Also preferably, magnetic field sensors may be associated with the transmitter on the same side of the passage, for detecting the actual magnetic field that is generated by the transmitter, as a reference variable.

The above-mentioned object is achieved by a method according to the invention in that each sensor unit generates a static magnetic field or a dynamic alternating magnetic field that is scanned by means of a detector field formed by a plurality of magnetic field detectors, wherein the run of the drive chain that is to be scanned is guided between the magnetic field generator and the detector field and the chain condition of the drive chain is determined from a change in the position of the magnetic field or alternating magnetic field detected in the detector field.

In the method according to the invention, it is particularly advantageous if each magnetic field detector of the detector field scans the magnetic field or alternating magnetic field that is emitted by the transmitter and transmitted by the drive chain and hence by the chain links or entrainers, and the chain condition, in particular the position of the chain links or entrainers, is determined from the position of the magnetic field detector or detectors that determine the greatest magnetic field strength. It is particularly advantageous if the characteristics such as the speeds of rotation of drive motors of the drive stations are detected in the evaluation and control unit, and regulation of the speed and/or a change in the tension condition of the tensioning unit is performed as a function of the determined chain condition. The chain condition that is determined by the magnetic sensor unit may, however, also be used to control the tensioning means without detecting the speed of rotation. According to a further embodiment of the method having a transmitter that generates a dynamic alternating magnetic field, magnetic field sensors that are associated with the transmitter can be used to detect the actual alternating magnetic field that is generated by the transmitter and supply it to the evaluation unit as a reference value, and/or the rotational position of a rotary drive for the transmitter is detected and supplied to the evaluation unit as a reference value. These reference values may additionally be used to check the measured result for the presence of erroneous measurements.

Since, as measurements made by the Applicant have shown, not only may an individual entrainer or chain link include different preferential directions of magnetization but, even with identical magnetization, different changes in the magnetic field or alternating magnetic field that is introduced may occur, and since moreover interactions may occur between adjacent entrainers or chain links, in the particularly preferred embodiment every time the drive chain comes to a standstill a reference or calibration is performed in which for each chain link or entrainer a reference value for the basic magnetization is determined and, during operation, is compared with the measurement value that is presently detected by means of the detector field in order to determine therefrom a change in the chain condition, such as a change in position or an increase in wear in the individual chain links or entrainers.

These and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 2 shows, starkly schematically simplified, a drive frame of a drive station for the extraction device from FIG. 1, with a sensor unit incorporated therein;

FIGS. 3A-C show, starkly schematically simplified in a system diagram, position detection in the magnetic sensor unit according to the invention;

FIGS. 5A-C show the detection of different chain positions in the plow device of FIG. 4;

DETAILED DESCRIPTION OF EMBODIMENTS

Figure 1:
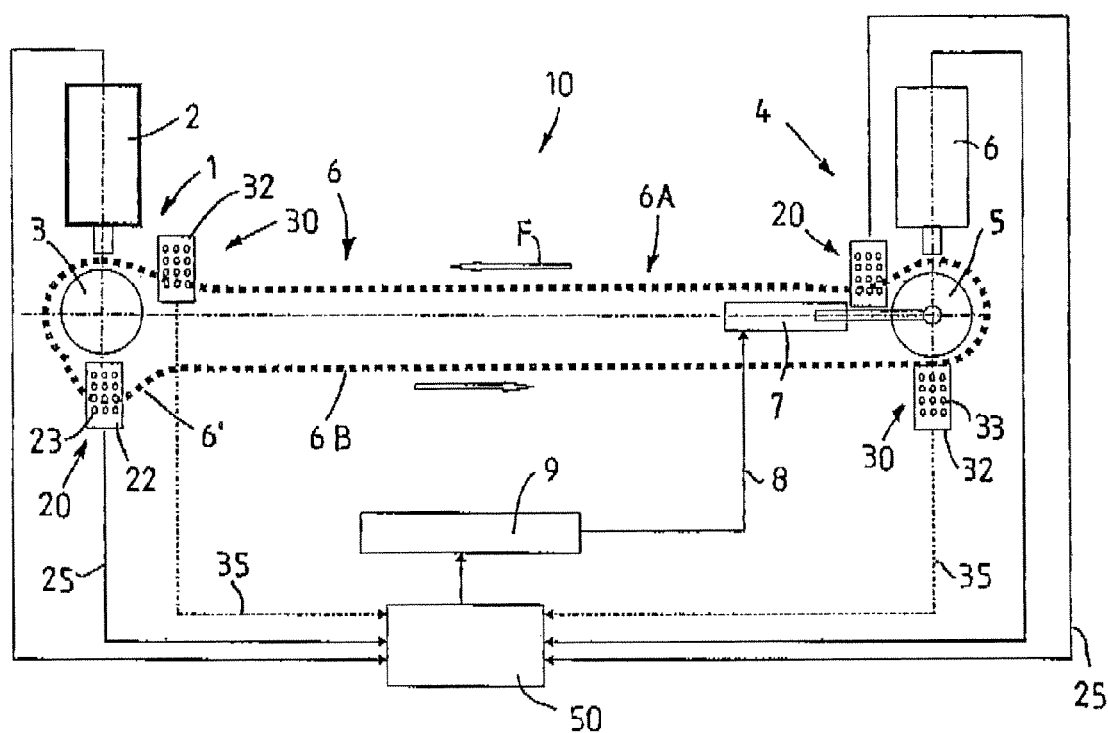
FIG. 1 shows, schematically simplified, a sketch of the principle of an extraction device for subterranean mining according to the invention, which is in the form of a conveyor.

Referring now to the drawings wherein the showings are for the purpose of illustrating preferred and alternative embodiments of the invention only and not for the purpose of limiting same, FIG. 1 shows, in a schematic illustration of the system, a conveyor device which is designated overall by reference numeral 10, for subterranean mining. The conveyor device 10 includes, in a manner known per se, a first drive station 1 having a schematically illustrated drive motor 2 and a sprocket 3 and, at the other end of the conveyor device 10, a second drive station 4 once again having a sprocket 5 and an associated drive motor 6. The drive motors 2 and 6 may in principle take any form suitable for the intended purpose and be constructed as synchronous motors, frequency converter motors or similar, and include gears, regulating means, overload clutches and similar. Between the two sprockets 3, 5 there circulates, in the direction of conveying indicated by the arrow F, an endless scraper chain 6, wherein material which has been extracted from a subterranean longwall using suitable extraction tools is transported on an upper run 6A by means of entrainers 11, which are indicated schematically in FIGS. 2 and 3A-C, in the direction of the drive station 1, which in this case forms the main drive. The upper run of the drive chain that circulates on the sprockets 3, 5 is designated 6A in FIG. 1, and the return run or no-load run of the drive chain 6 is designated by reference numeral 6B. In the case of a subterranean conveyor, the drive toward which the upper run 6A runs provides the greater drive power, which is why the risk of hanging chain occurs predominantly in the lower run 6B downstream of the sprocket 3 of the drive station 1, but also in the lower run 6A downstream of the sprocket 5 of the drive station 4. To compensate for different tension conditions in the drive chain 6, in the conveyor device 10 the auxiliary drive, and hence the drive station 4, is allocated a hydraulic tensioning means 7, by means of which the spacing between the sprockets 3, 5 of the drive stations 1, 4 can be varied. The tensioning means 7 is extended or retracted as a function of a control signal from a hydraulic control means 9, indicated by the line 8.

In the case of the conveyor device 10, as shown by FIGS. 3A-3C, a drive chain 6 taking the form of a two-center chain having horizontal chain links 12 and vertical chain links 13 and to which entrainers (scrapers) 11 are secured at given intervals is used. So that, in the case of the conveyor device according to FIG. 1, it is possible to detect the occurrence of hanging chain on the drive chain 6 or the occurrence of wear on the chain links 12, 13 or the entrainer 11, a sensor unit that is designated 20 in FIG. 1 is associated with both drive stations 1, 4. In the case of the main drive, and hence the drive station 1 in FIG. 1, the sensor unit 20 is associated with the lower run 6B in the direction of movement of the chain downstream of the sprocket 3, and in the case of the drive station 4 that forms the auxiliary drive it is associated with the upper run 6A in the direction F of movement of the chain away from the sprocket 5. Preferably, the two sensor units 20 are of identical construction and comprise a transmitter, which in the exemplary embodiment described generates an alternating magnetic field and is designated schematically by reference numeral 21 in FIGS. 2 and 3A-3C, and a detector field 22 having a plurality of magnetic field detectors 23 which are arranged next to and above one another, as a detector for the alternating magnetic field which is emitted by the transmitter 21. The alternating magnetic field transmitter 21 is arranged in one of the two side panels 14 on one side of a passage 15 for the entrainers 11 and the chain links 12, 13, and the detector field 22 lies opposite the transmitter 21, in the other side panel 15. Since FIG. 2 shows schematically the drive station 1 that forms a main drive, in this case the magnetic transmitter 21 and the detector field 23 are incorporated in the side panels 14, 15 in the region of the lower run 6B of the drive chain 6 in a position in which the hanging chain indicated in FIG. 1 by the bulging portion 6' can be detected from a change in the height of the entrainers 11 in relation to the tangential path away from the sprocket 3. Both the transmitter 12 and the detector field 22 may be arranged in a housing of non-magnetic material. However, the side panels could also be made at least partly from suitable non-magnetic material. The alternating magnetic field generator 21 may advantageously comprise a permanent magnet or, if there are no explosion-proofing requirements, from an electromagnet that is mounted on a preferably variable-speed motor and is rotated at speeds of up to 1000 rpm to generate a modulated or dynamic magnetic field (alternating magnetic field) for detection with the detector field 22. The rotary drive for the magnet or magnets may in particular be a hydraulic motor (not shown), which is rotated by hydraulic medium flowing through it. The detector field 22 in turn comprises a matrix having a suitable number of magnetic field detectors 23 which are arranged above and next to one another such that the magnetization introduced into the entrainers 11 by the transmitter 21 on the one side, and temporary magnetization, can be detected by each of the individual magnetic field detectors 23.

FIGS. 3A, 3B and 3C illustrate schematically the position of an entrainer 11 in three different positions in relation to the detector field 22. FIG. 3A shows an entrainer 11 that is passing the passage 15 between the alternating magnetic field generator 21 and the detector field 22, with the magnetic field detectors 23 arranged in the manner of a matrix above and next to one another, in the central position, that is with normal chain tension. The individual detectors 23 in the detector field 22 detect different magnetic field strengths, and from these the indicated central position can be deduced. The magnetic fields which are set up at the entrainer 11 because of the alternating magnetic field emitted by the transmitter 21 are indicated schematically for the purpose of the illustration, as magnetic flux lines. In FIG. 3B, the entrainer 11 has moved upward because the chain tension is too high. The magnetic flux lines indicate that the magnetic field in the entrainer 11 generated by the alternating magnetic field 21 has moved upward while the magnetic field strength in principle remains the same, so magnetic field detectors 23 that are higher up detect the maximum amplitude of the field strength, while the magnetic field detectors 23 lower down detect a significantly lower magnetic field strength. Because a modulated alternating magnetic field has been introduced into the entrainers 11, it goes without saying that the magnetic field detectors 23 also detect a modulated magnetic field that has been generated in accordance with the rotational frequency of the alternating magnetic field. Because the rotational frequency of the alternating magnetic field is sufficiently high, a sufficient number of changes in amplitude of the alternating magnetic field is similarly detected during passage of the entrainer 11 to allow the present position of the entrainer 11 to be detected reliably and without any influence from magnetization of the entrainers 11. FIG. 3C shows the condition before or on occurrence of hanging chain. The entrainer 11 is located in a position at the lower end of the detector field 22, so the magnetic field detectors 23 that are lowest down detect the maximum change in amplitude of the alternating magnetic field that has been introduced into the entrainer 11 by the transmitter 21. Each displacement of the magnetic field is also indicated at the transmitter 21 by the different positions of the magnetic flux lines of the magnetic field.

Reference is now made again to FIG. 1. The signals that are detected by the detector field 22 for the individual magnetic field detectors 23 are supplied to a higher-level control unit 50. The present speed of the drive motors 2 and 6 can also be supplied to the control unit 50 by way of the signal lines indicated by the signal lines 25 in FIG. 1. The evaluation and control unit 50 can generate, from the measurement data of the detector field 22 that is supplied by way of the signal lines 25 and the present speeds of the drive motors 2, 6, control signals that are supplied to the hydraulic control 9 to bring about an extension or retraction of the hydraulic tensioning means 7 by way of the signal line 8 and to change the position of the sprocket 5 on the auxiliary drive 4 in order to tension the hanging chain out of the way, or to minimize the chain tension if the drive chain 6 is too slack. In parallel with this, the regulating and evaluation unit 50 can also emit control signals for the drive motors 2, 6 in order to prevent hanging chain from occurring or to prevent excessively taut chain tension, by altering the respective speeds of the drive motors 2, 6.

In the exemplary embodiment of FIG. 1, two further sensor units 30 are indicated, by way of which where appropriate further chain conditions can be detected in both the drive station 1 and the drive station 4. In the main drive 1, the further sensor unit 30 is arranged on the upper run 6A upstream as it approaches the sprocket 3, and the sensor unit 30 at the drive station 4 forming the auxiliary drive is arranged on the lower run 6B approaching the sprocket 5. The measuring principle of the sensor unit 30 in the exemplary embodiment shown is once again based on introducing a modulated magnetic field (alternating magnetic field) into the entrainers and scanning the modulated magnetic field that is taken up by the entrainer as it passes the magnetic field of the alternating magnetic field generator, using a sensor field 32 having a plurality of magnetic field detectors 33. The measurement signals of the detector field 32 can be supplied to the evaluation and control unit 50, once again by way of signal lines 35.

Figure 4:
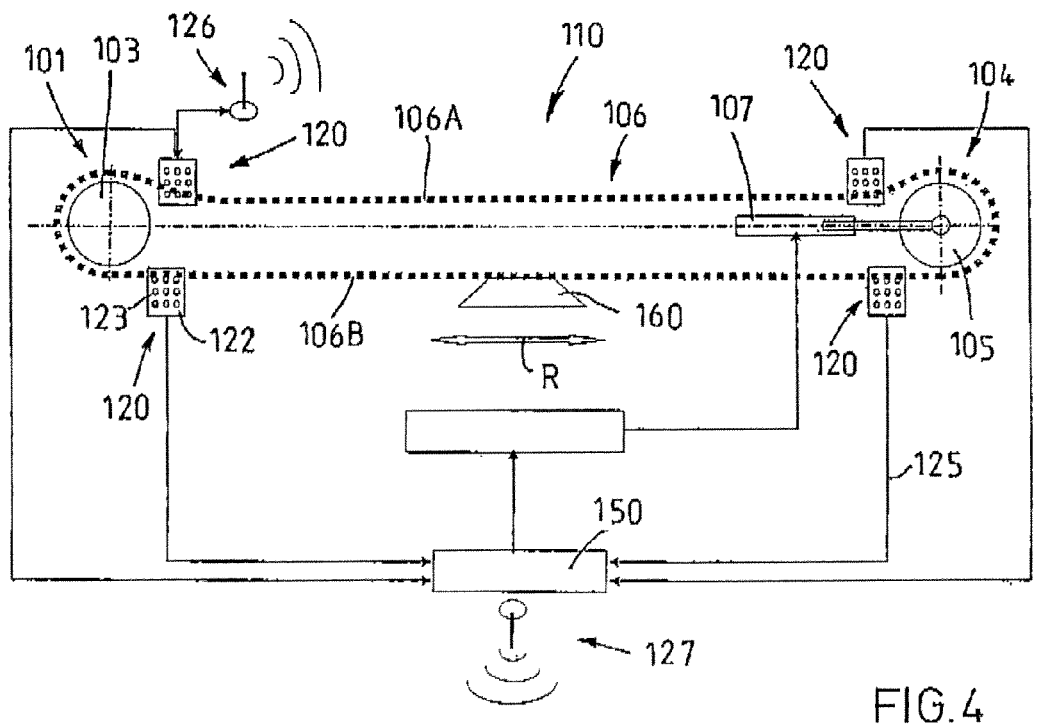
FIG. 4 shows, in a schematic diagram similar to FIG. 1, an extraction device in the form of a plow device, with a sensor unit according to the invention.

FIG. 4 shows, in a diagrammatic illustration, utilization of the same system technology in a plow device 110 for subterranean mining. An extraction plow 160 is moved back and forth, reversing from one drive station 101 to the other 104 or vice versa, as indicated by the double-headed arrow R in FIG. 4, by means of a plow chain belt 106 which is in principle endless and comprises interlinked vertical and horizontal chain links (112, 113, FIG. 5). The drive station 101 has drive motors (not shown) and a sprocket 103 for the plow chain 106, and the drive station 104 has a sprocket 105 and a tensioning means 107. Depending on the direction in which the plow 160 moves, one of the two drives forms a main drive and the other the respective auxiliary drive. The plow chain 106 once again forms an upper run 106A and a lower run 106B which, depending on the direction R in which the plow 116 moves, form the pulling or return run. Since hanging chain and/or excessive chain tension can occur both in the outward and the return run of each sprocket 103, depending on the direction R in which the plow body 160 is moving, in the plow device 110 four identical sensor means 120 are provided, which on one side include a detector field 122 with a sufficiently large number of magnetic field detectors 123 that are arranged in the manner of a matrix and are arranged to the side of the passage for the chain 106. A respective alternating magnetic field generator 121, shown schematically in FIGS. 5A, 5B and 5C, is associated with each detector field 122 and lies opposite the detector field 122 and is also arranged to the side of the passage 115 for the drive chain belt 106. Because, in the case of the plow device 110, a change in the alternating magnetic field that is preferably introduced into the horizontal chain links 112 is detected by the magnetic field detectors 123 in the detector field 122, the spacing between the generator 121 and the detector field 122 is markedly smaller than in the previous exemplary embodiment. Moreover, the generator 121 and the detector field 122 can be incorporated, as an alternative to the machine frame, directly into side walls of a plow box (not shown) in which the sprockets 103 and 105 are respectively mounted, in order to detect the change in the modulated magnetic field in a relatively protected position. Similarly to the previous exemplary embodiment, an upward displacement of the plow chain 106 is detected as a result of detecting the maximum amplitude of the alternating magnetic field by magnetic field detectors 123 that are higher up, as indicated in FIG. 5B, or with magnetic field detectors 123 that are lower down, as indicated in FIG. 5C, depending on whether the chain moves upward because of excessive chain tension or, in the event of hanging chain, downward in relation to a central position. In the case of the plow device 110 too, a control and evaluation unit 150 is provided to which at least all the measurement values of the four detector fields 122 of the sensor units 120 are supplied. The signal may either by supplied by way of signal lines 125, by way of a system bus or wirelessly by way of radio, as indicated by the radio transmitter 126 and the radio receiver 127 in FIG. 4. It will be appreciated that the radio receiver 127 may also be designed for bidirectional data transmission.

So that the magnetic sensor units can where appropriate be used to detect chain wear or entrainer wear as well, and so that hanging chain can be detected with a high level of reliability, every time the extraction device comes to a standstill a reference or calibration movement may be performed in which for each chain link or, in the case of a plow device, for each horizontal chain link or, in the case of a conveyor device, for each entrainer a reference value is determined. In the most favorable case, in this connection the evaluation and regulation unit is aware of the number of horizontal chain links or entrainers that are incorporated into the system. By storing a reference value for each entrainer or each chain link it is possible, because the individual magnetic field of each entrainer and each horizontal chain link changes as the amount of wear increases, to determine the present amount of wear from a comparison of the reference values with reference values of previous calibration movements or, in the case of operation that continues for a relatively long period, a comparison of the present values with the reference values from a change in the transmitted magnetic field as the alternating magnetic field transmitter passes, in order to establish a maintenance interval promptly before a chain can break off or similar. The sensor unit that is used with the extraction device is not therefore limited to the application of detecting hanging chain.

The exemplary embodiments show schematically how the alternating magnetic field generators and detector field are arranged. It is also possible to arrange considerably more than only nine or twelve magnetic field detectors in the detector field; for example, 16 or 27 magnetic field detectors may be provided to increase the resolution of the system. The magnet that is used to generate the modulated magnetic field may be a powerful permanent magnet (supermagnet) of for example neodymium iron boron (NdFeB) or another suitable material for supermagnets, of a sufficiently high magnetic field strength of for example 1T, which is driven at a frequency of for example up to 1000 rpm in order to generate an alternating magnetic field having a sufficient number of amplitude changes when the entrainers or chain links pass through. The rotational position may in this case be detected as a reference value. It is also possible to associate magnetic field sensors with the transmitter, where appropriate on the same side of the passage. The magnetization condition introduced into the entrainers or chain links by the alternating magnetic field is markedly different from the initial magnetization condition of the entrainers or chain links, with the result that the dynamic modulated alternating magnetic field can differ reliably from the initial magnetization of the entrainer when it passes a sensor field. The sensor system should take measurements in at least two directions, preferably all three field directions, and include a sufficient number of magnetic field detectors.

Figure 6:
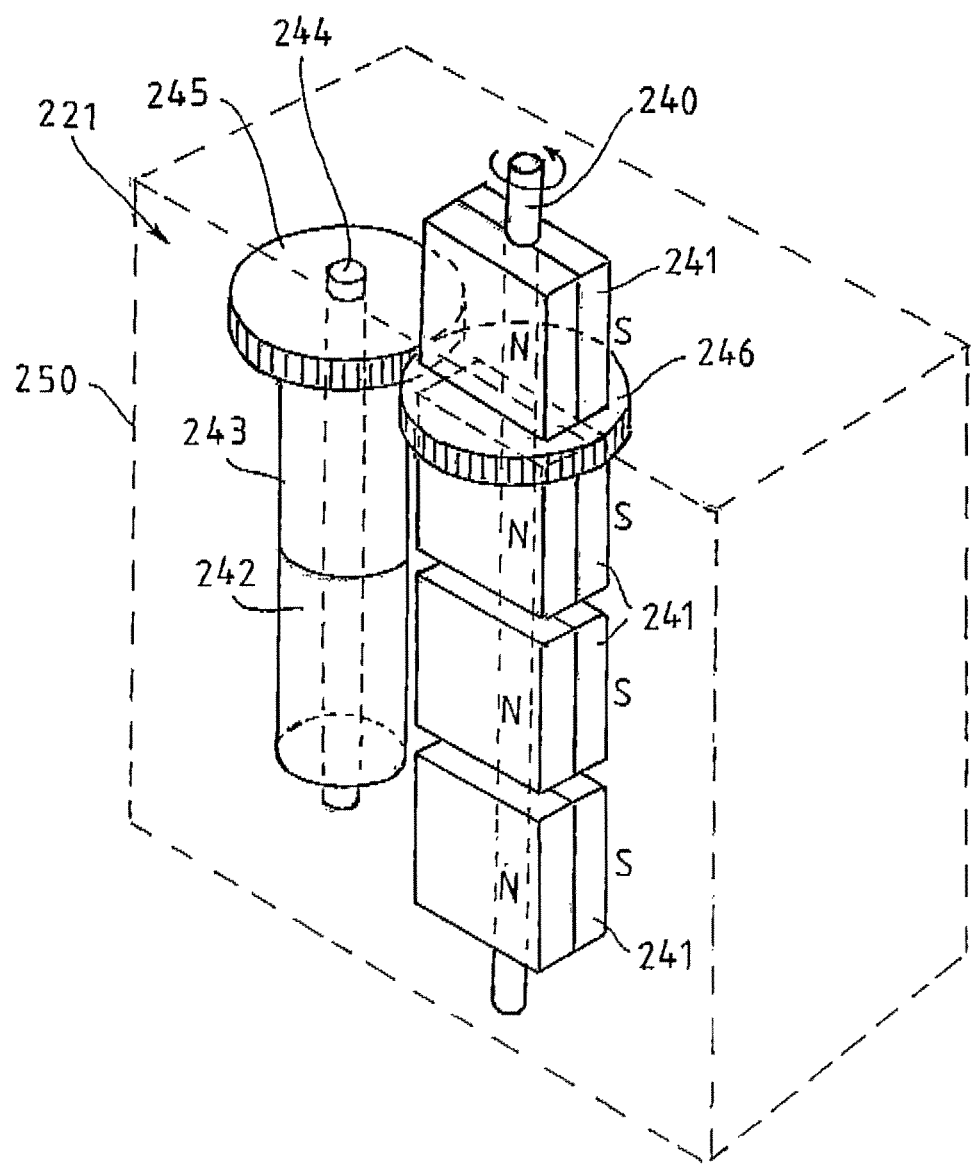
FIG. 6 shows, starkly schematically simplified in a perspective view, an exemplary embodiment of an alternating magnetic field generator.

FIG. 6 shows schematically an exemplary embodiment of a alternating magnetic field generator 221 as a transmitter for a sensor unit according to the invention. The alternating magnetic field generator 221 includes a housing 250, which is preferably box-shaped and may be inserted into a receiving hollow in the side panels for example of a machine frame and in which there is housed a rotary shaft 240, to which a plurality of block magnets 241 that are arranged above one another are non-rotationally secured. The permanent magnets, in this case comprising block magnets 241, are preferably arranged with the magnetization respectively aligned in the same way. In the exemplary embodiment shown, all the poles of the block magnets 241 that are designated N and all those that are designated S are aligned with one another, in each case above one another. To drive the rotary shaft 240 and the magnets 241 connected thereto, there is furthermore arranged in the housing for example a hydraulic drive 242, which is coupled to a gear 243 on the output shaft 244 whereof there is arranged a toothed wheel 245 that meshes with a toothed wheel 246 that is once again connected non-rotationally to the rotary shaft 240. The hydraulic drive may in particular comprise a hydraulic motor having a current-regulating valve (not shown) for adjusting the speed of rotation. When the rotary shaft 240 rotates, a dynamic alternating magnetic field is produced over the entire height of the alternating magnetic field generator 221, and this may be introduced into the entrainers of the drive chain and detected at the opposite end of the entrainers by the sensor unit.

Figure 7:
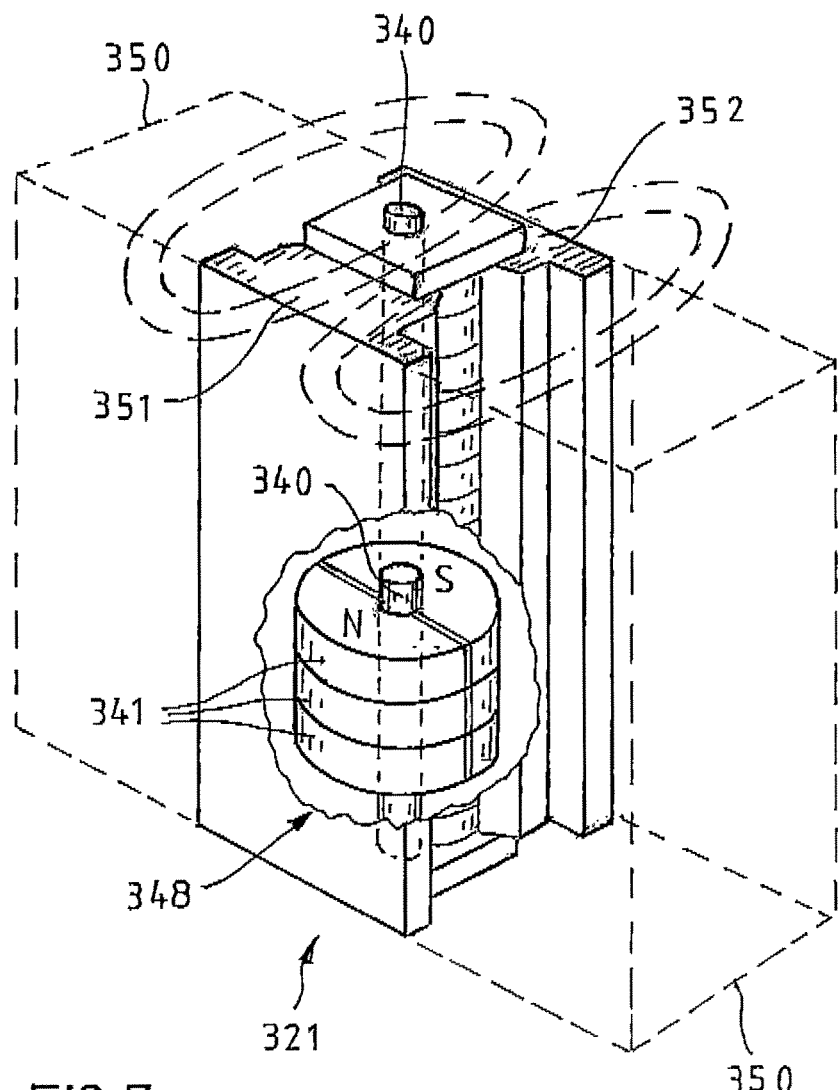
FIG. 7 shows, starkly schematically simplified in a perspective view, an exemplary embodiment of a magnetic field generator with a variable magnetic field, in partly cut-away view.
Figure 8:
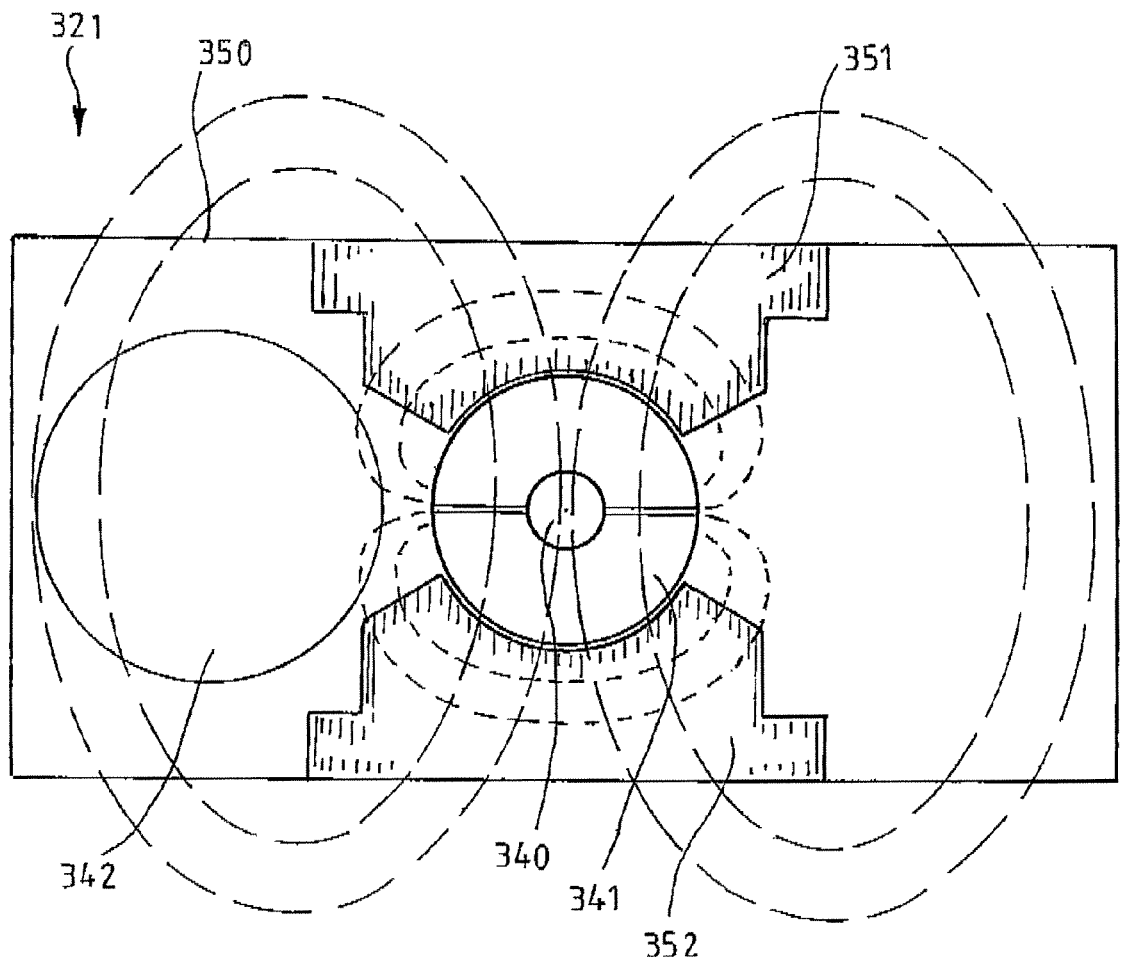
FIG. 8 shows the magnetic field generator of FIG. 7 in plan view.

The above description of the figures has been given for an extraction device having a sensor unit which has an alternating magnetic field generator as the transmitter, for a dynamic magnetic field. However, the transmitter could also generate a static magnetic field that is scanned with a detector field in an extraction device as described above. FIGS. 7 and 8 show by way of example an exemplary embodiment of a magnetic field generator 321 of this kind, by means of which a static but variable magnetic field may be generated. Inside a box-shaped housing 350 there are arranged, on the longwise sides—of which, in operation, one faces the machine panel and the other faces the passage in the drive station—respective pole plates 351, 352 made of preferably soft-magnetizable iron material, between which a stack 348 of magnets comprising, in this case, a plurality of ring magnets 341 which are arranged above one another and are diametrically magnetized, is arranged. The ring magnets 341 are arranged such that all the poles designated N and the poles S lie above one another in approximate respective alignment. All the ring magnets 341 are secured to a magnet shaft 340, which can be turned in its alignment relative to the pole plates 351, 352 by means of a rotary drive 342, indicated schematically in FIG. 8 and coupled thereto for example by way of toothed wheels, in order to introduce different strengths of magnetic field into the pole plates 351, 352 as a function of the relative position of the magnet stack 348 thereto, and to this extent also into the entrainers or chain links that are moving past. Preferably, the magnet shaft is only rotated during a calibration run, whereas during operation the magnet shaft is fixed as a result of the switched-off rotary drive and the effective step-down ratio. With the magnetic field generator 321 as the transmitter of the sensor unit, it is possible to generate a static, unmodulated magnetic field that is introduced into the entrainers from the one side of the machine frame and is scanned by the detector field on the other side of the machine frame. By altering the alignment of the magnet stack 348 relative to the passage or the detector field, it is always possible to take the measurement using an optimum magnetic field.

The invention is not restricted to the schematically shown exemplary embodiments. At least one of the drive stations could also be a driveless reversing station which merely deflects the drive chain by means of its sprocket. Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An extraction device, particularly for mining, having a first drive station and a second drive station which is preferably capable of being tensioned by a tensioning means, the device having sprockets which are mounted in the drive stations, the device further including a drive chain which includes chain links being movable by means of the sprockets and extends between the sprockets in the form of an upper run and a lower run, the device having at least one magnetic sensor unit for detecting at least one chain condition of the drive chain in at least one of the upper run and the lower run, each sensor unit comprising a transmitter which includes a magnetic field generator and a detector field, the detector field including a plurality of magnetic field detectors, the detector and the transmitter being arranged to the side of a passage for the run of the drive chain that is to be scanned.

2. The extraction device as claimed in claim 1, wherein the detector and transmitter are arranged opposite one another on either side of the passage.

3. The extraction device as claimed in claim 1, wherein the detector field extends over a substantial portion of the height of the passage.

4. The extraction device as claimed in claim 1, wherein the plurality of magnetic field detectors includes a plurality of field detectors that are arranged next to one another and a plurality of field detectors that are arranged above one another.

5. The extraction device as claimed in claim 1, wherein the detector field is arranged in one of a side panel of a machine frame and a side wall of a sprocket casing of the drive station.

6. The extraction device as claimed in claim 5, wherein the generator for the magnetic field is arranged in the other of the side panel of the machine frame and the side wall of the sprocket casing of the drive station.

7. The extraction device as claimed in claim 1, wherein at least one of the detector field and the transmitter are arranged in a housing made from non-magnetic material.

8. The extraction device as claimed in claim 1, wherein the non-magnetic material includes at least one of brass, bronze, copper, aluminum, titanium, austenitic steel or alloys thereof, ceramic and synthetic material.

9. The extraction device as claimed in claim 1, wherein the transmitter is formed by an alternating magnetic field generator.

10. The extraction device as claimed in claim 9, wherein the alternating magnetic field generator includes rotating magnets.

11. The extraction device as claimed in claim 9, wherein the transmitter includes a hydraulic rotary drive with a current-regulating valve for adjusting the speed of rotation.

12. The extraction device as claimed in claim 10, wherein the rotating magnets forming the transmitter each has a magnetic field strength of at least 0.5 T.

13. The extraction device as claimed in claim 1, wherein the transmitter is a static magnetic field generator.

14. The extraction device as claimed in claim 1, wherein the magnetic field generator includes a permanent magnets.

15. The extraction device as claimed in claim 1, wherein the permanent magnets are a supermagnet.

16. The extraction device as claimed in claim 1, wherein the magnet or magnets of the transmitter form a magnet arrangement whereof the position and/or alignment in relation to the magnetic field sensor is variable.

17. The extraction device as claimed in claim 1, wherein the transmitter includes a magnet arrangement having a plurality of ring magnets which are arranged concentrically around a central axis, wherein the annular arrangement may be turned about the central axis by means of an actuator and may preferably be positioned in different turned positions by means of the actuator.

18. The extraction device as claimed in claim 1, wherein the extraction device takes the form of a conveyor with entrainers in the drive chain, and each drive station including at least one sensor unit which is associated with the run that is downstream of the sprocket in the respective direction of movement of the chain.

19. The extraction device as claimed in claim 1, wherein the extraction device is provided with a reversible drive chain, and each drive station includes two sensor units, wherein in each drive station one sensor unit is associated with the upper run and the other sensor unit is associated with the lower run.

20. The extraction device as claimed in claim 1, wherein the magnetic field detectors are associated with the transmitter on the same side of the passage, for detecting the actual magnetic field that is generated by the transmitter, as a reference variable.

21. A method for controlling an extraction device particularly for mining, having a first drive station and a second drive station which is preferably capable of being tensioned by a tensioning means, the extraction device having sprockets which are mounted in the drive stations, the device further including a drive chain which includes chain links and may be moved by means of the sprockets and extends between the sprockets in the form of an upper run and a lower run, the extraction device further including at least one magnetic sensor unit for detecting at least one chain condition of the drive chain in at least one of the upper run and the lower run, the extraction device having an evaluation and control device to which signals from the magnetic sensor unit are supplied and by means of which the extension condition of the tensioning means or the drives of the drive stations may be controlled, each sensor unit generating a magnetic field that is scanned by means of a detector field formed by a plurality of magnetic field detectors, wherein the run of the drive chain that is to be scanned is guided between the magnetic field generator and the detector field and the chain condition of the drive chain is determined from a change in the position of the magnetic field detected in the detector field.

22. The method as claimed in claim 21, wherein each magnetic field detector of the detector field scans the magnetic field that is emitted by the transmitter and transmitted by the drive chain, and the chain condition is determined from the position of the magnetic field detector or detectors that determine the greatest magnetic field strength.

23. The method as claimed in claim 21, wherein the transmitter generates an alternating magnetic field, and magnetic field sensors that are associated with the transmitter are used to detect the actual alternating magnetic field that is generated by the transmitter and supply it to the evaluation and control device as a reference value.

24. The method as claimed in claim 21, wherein the rotational position of a rotary drive is detected for the transmitter and is supplied to the evaluation unit as a reference value.

25. The method as claimed in claim 21, wherein the transmitter includes ring magnets which are arranged concentrically relative to a central axis and form an annular arrangement which is turned in order to generate a variable magnetic field.

26. The method as claimed in claim 21, wherein the characteristics of drive motors of the drive stations including the speeds of rotation is detected in the evaluation and control unit, and regulation of the speed is performed as a function of the determined chain condition.

27. The method as claimed in claim 21, wherein every time the drive chain comes to a standstill a calibration is performed in which for each chain link or entrainer a reference value for the basic magnetization is determined and, during operation, is compared with the present value that is detected by means of the detector field.

28. The method as claimed in claim 21, wherein the signals are transmitted between the sensor units and the evaluation and control unit by way of radio.

* * * * *